(12) United States Patent
Horn et al.

(10) Patent No.: US 11,721,488 B2
(45) Date of Patent: *Aug. 8, 2023

(54) MULTILAYER CERAMIC CAPACITOR HAVING ULTRA-BROADBAND PERFORMANCE

(71) Applicant: AVX Corporation, Fountain Inn, SC (US)

(72) Inventors: Jeffrey A. Horn, Fountain Inn, SC (US); Marianne Berolini, Greenville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,749

(22) Filed: Mar. 3, 2021

(65) Prior Publication Data

US 2021/0193392 A1 Jun. 24, 2021

Related U.S. Application Data

(63) Continuation of application No. 16/292,770, filed on Mar. 5, 2019, now Pat. No. 10,943,735.

(Continued)

(51) Int. Cl.
*H01G 4/30* (2006.01)
*H01G 4/248* (2006.01)
(Continued)

(52) U.S. Cl.
CPC .............. *H01G 4/30* (2013.01); *D02G 3/042* (2013.01); *D02G 3/045* (2013.01); *D02G 3/44* (2013.01);
(Continued)

(58) Field of Classification Search
CPC ........... H01G 4/12; H01G 2/065; H01G 2/24; H01G 4/0085; H01G 4/012; H01G 4/20;
(Continued)

(56) References Cited

U.S. PATENT DOCUMENTS

| 5,021,921 A | 6/1991 | Sano et al. |
| 6,587,327 B1 | 7/2003 | Devoe et al. |

(Continued)

FOREIGN PATENT DOCUMENTS

| JP | 2012138391 A | 7/2012 |
| JP | 2015070144 A | 4/2015 |

OTHER PUBLICATIONS

International Search Report and Written Opinion for PCT/US2019/020710 dated Jun. 27, 2019, 13 pages.

*Primary Examiner* — Michael P McFadden
(74) *Attorney, Agent, or Firm* — Dority & Manning, P.A.

(57) ABSTRACT

A multilayer ceramic capacitor is disclosed including a first external terminal disposed along a first end of the capacitor, a second external terminal disposed along a second end of the capacitor opposite the first end, an active electrode region containing alternating dielectric layers and active electrode layers, and a shield electrode region including at least two shield electrodes that are spaced apart by a shield layer gap in the longitudinal direction. The distance from the active electrode region to the shield electrode region may range from about 4% to about 20% of a thickness of the capacitor between a top surface and a bottom surface opposing the top surface. The shield layer gap may range from about 3% to about 60% of an external terminal gap between the first external terminal and second external terminal in the longitudinal direction on at least one of the top or bottom surfaces.

19 Claims, 8 Drawing Sheets

Related U.S. Application Data

(60) Provisional application No. 62/639,236, filed on Mar. 6, 2018.

(51) Int. Cl.
*H01G 4/12* (2006.01)
*H01G 4/008* (2006.01)
*D02G 3/04* (2006.01)
*D02G 3/44* (2006.01)
*G09F 3/02* (2006.01)

(52) U.S. Cl.
CPC .............. *G09F 3/02* (2013.01); *H01G 4/008* (2013.01); *H01G 4/1227* (2013.01); *H01G 4/1245* (2013.01); *H01G 4/248* (2013.01); *G09F 2003/0223* (2013.01)

(58) Field of Classification Search
CPC ........ H01G 4/2325; H01G 4/30; H01G 4/306; H01G 4/33; H01G 4/008; H01G 4/1227; H01G 4/1245; H01G 4/248; D02G 3/042; D02G 3/045; D02G 3/44; G09F 3/02; G09F 2003/0223
See application file for complete search history.

(56) References Cited

U.S. PATENT DOCUMENTS

| | | |
|---|---|---|
| 6,816,356 B2 | 11/2004 | Devoe et al. |
| 6,970,341 B1 | 11/2005 | Devoe et al. |
| 7,085,124 B2 | 8/2006 | Togashi |
| 7,177,137 B2 | 2/2007 | Ritter et al. |
| 7,265,964 B1 | 9/2007 | Togashi |
| 7,336,475 B2 | 2/2008 | Bultitude et al. |
| 7,334,981 B2 | 3/2008 | Ritter et al. |
| 7,463,474 B2 | 12/2008 | Ritter et al. |
| 7,715,173 B2 | 5/2010 | Bultitude et al. |
| 7,843,679 B2 | 11/2010 | Togashi |
| 7,859,821 B2 | 12/2010 | Shimizu |
| 8,446,705 B2 | 5/2013 | Ritter et al. |
| 8,576,538 B2 | 11/2013 | Kuroda et al. |
| 8,780,523 B2 | 7/2014 | Seo et al. |
| 8,885,319 B2 | 11/2014 | Bultitude et al. |
| 9,087,648 B2 | 7/2015 | Bultitude et al. |
| 9,418,789 B2 | 8/2016 | Lee et al. |
| 9,490,072 B2 | 11/2016 | Bultitude et al. |
| 10,304,629 B2 | 5/2019 | Kitamura et al. |
| 10,395,825 B2* | 8/2019 | Jang ....................... H01G 4/232 |
| 10,943,735 B2* | 3/2021 | Horn ....................... D02G 3/042 |
| 2010/0039749 A1* | 2/2010 | Ritter ....................... H01G 4/30 29/25.42 |
| 2015/0014035 A1* | 1/2015 | Park ....................... H01G 4/012 361/301.4 |
| 2015/0068792 A1* | 3/2015 | Cho ......................... H01G 2/06 174/258 |
| 2015/0318110 A1* | 11/2015 | Lee ........................... H01G 4/30 361/301.4 |
| 2018/0061574 A1* | 3/2018 | Kitamura ................. H01G 4/30 |
| 2019/0279819 A1 | 9/2019 | Horn et al. |

* cited by examiner

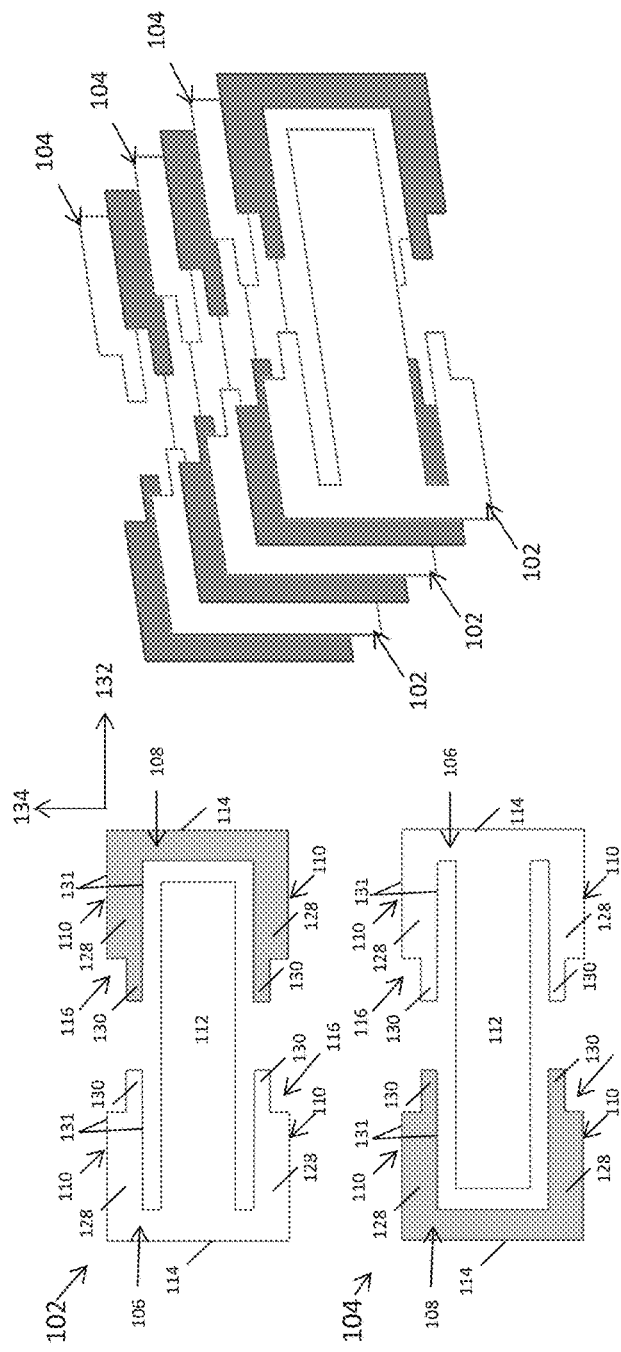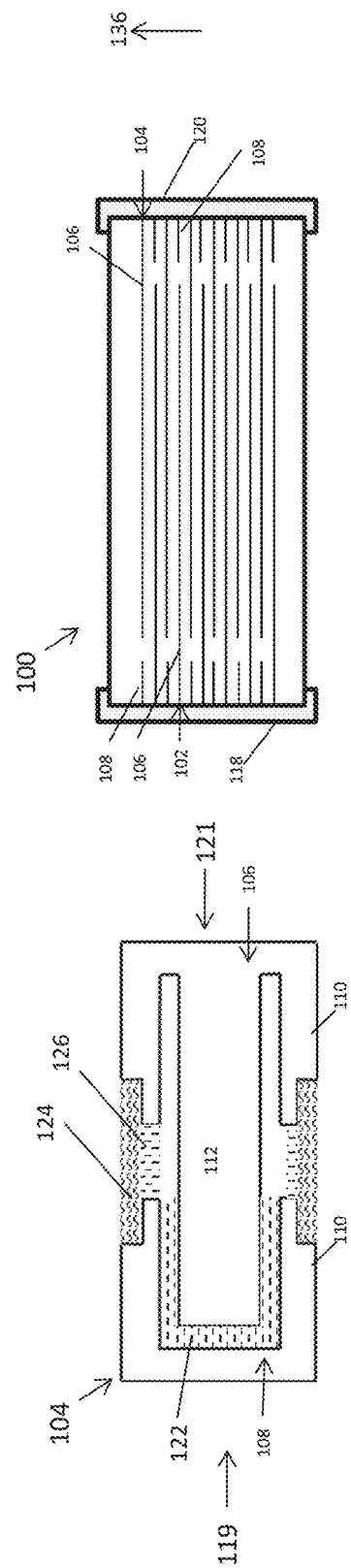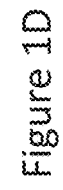
Figure 1A
Figure 1B
Figure 1C
Figure 1D

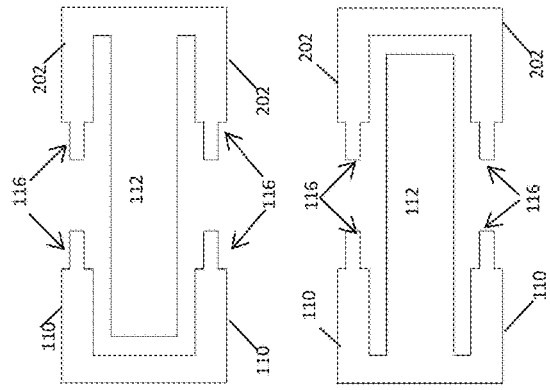
Figure 6A
Figure 6B
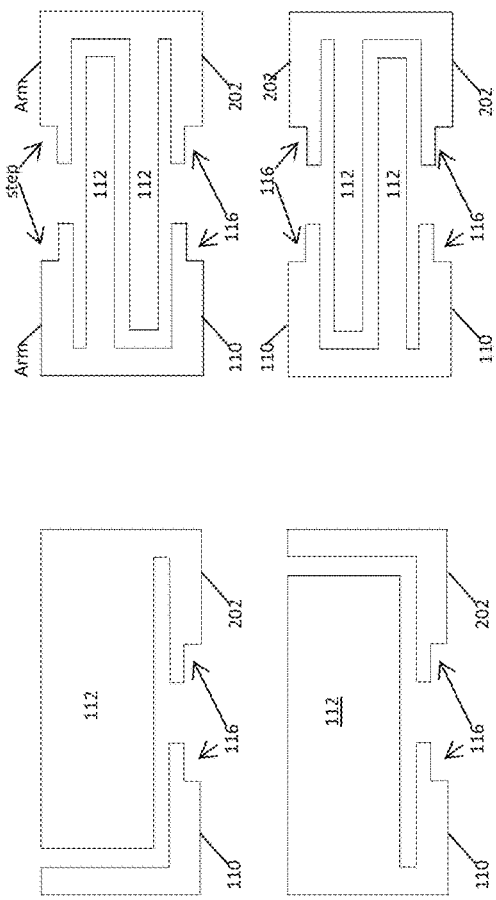
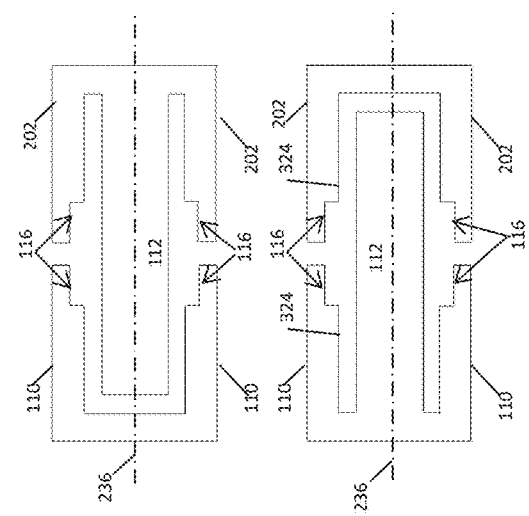
Figure 6C
Figure 6D

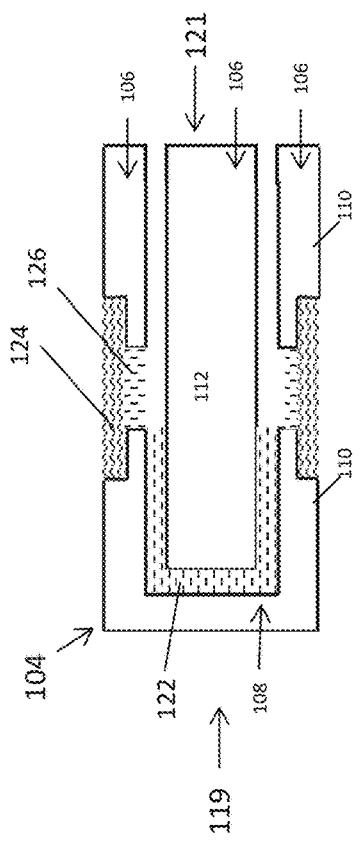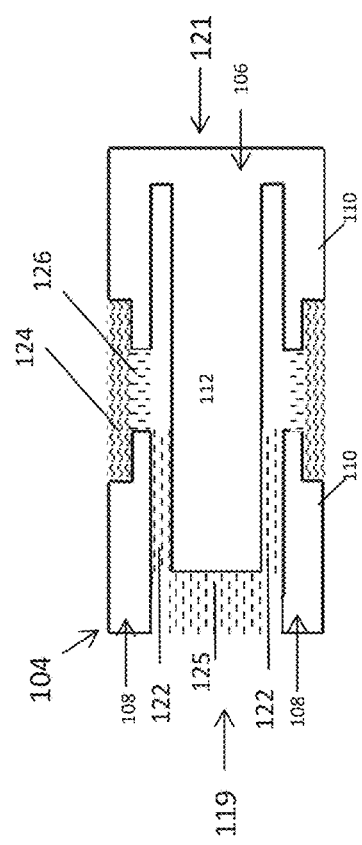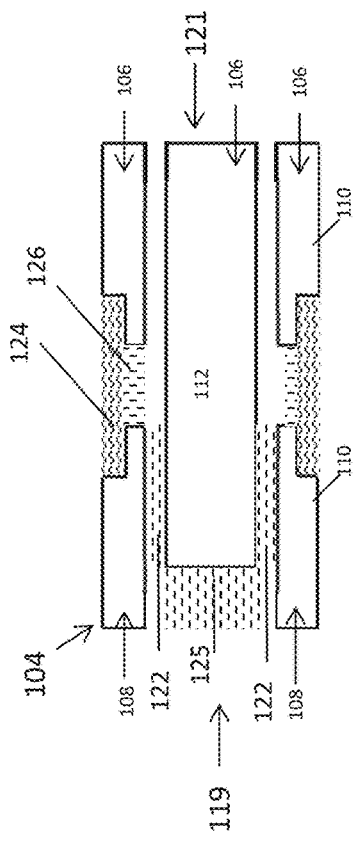
Figure 8A
Figure 8B
Figure 8C

MULTILAYER CERAMIC CAPACITOR HAVING ULTRA-BROADBAND PERFORMANCE

CROSS REFERENCES TO RELATED APPLICATIONS

The present application is a continuation of U.S. application Ser. No. 16/292,770 having a filing date of Mar. 5, 2019, which claims filing benefit of U.S. Provisional Patent Application Ser. No. 62/639,236 having a filing date of Mar. 6, 2018, which are incorporated herein by reference in their entirety.

BACKGROUND OF THE INVENTION

The diversity of modern technical applications creates a need for efficient electronic components and integrated circuits for use therein. Capacitors are a fundamental component used for filtering, coupling, bypassing and other aspects of such modern applications which may include wireless communications, alarm systems, radar systems, circuit switching, matching networks, and many other applications. A dramatic increase in the speed and packing density of integrated circuits requires advancements in coupling capacitor technology in particular. When high-capacitance coupling capacitors are subjected to the high frequencies of many present applications, performance characteristics become increasingly more important. Because capacitors are fundamental to such a wide variety of applications, their precision and efficiency is imperative. Many specific aspects of capacitor design have thus been a focus for improving their performance characteristics.

While the prior art has provided various configurations for capacitors to allow for improved performance, it would nevertheless be advantageous to provide a capacitor with similar or improved results, in particular with respect to broadband applications.

SUMMARY OF THE INVENTION

In accordance with one embodiment of the present invention, a multilayer ceramic capacitor is disclosed. The capacitor may include a first external terminal disposed along a first end of the capacitor, a second external terminal disposed along a second end of the capacitor that is opposite the first end in the longitudinal direction, an active electrode region containing alternating dielectric layers and active electrode layers, and a shield electrode region. The shield electrode region may contain at least two shield electrodes that are spaced apart by a shield layer gap in the longitudinal direction. The distance from the active electrode region to the shield electrode region may be from about 4% to about 20% of a thickness of the capacitor between a top surface and a bottom surface opposing the top surface. The shield layer gap may range from about 3% to about 60% of an external terminal gap between the first external terminal and second external terminal in the longitudinal direction on at least one of the top surface or the bottom surface.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIGS. 1A and 10 illustrate a top view of electrode layers in accordance with one embodiment of the present invention;

FIG. 1B illustrates a perspective view of alternating electrode layers of one embodiment of the present invention;

FIG. 1D illustrates a side cross sectional view of one embodiment of a capacitor of the present invention;

FIGS. 6A-6D illustrate top views of electrode layers in accordance with certain embodiments of the present invention.

FIGS. 8A-8C illustrate top views of various embodiments of an electrode layer of the present invention.

DETAILED DESCRIPTION OF THE PREFERRED EMBODIMENTS

Figure 2:
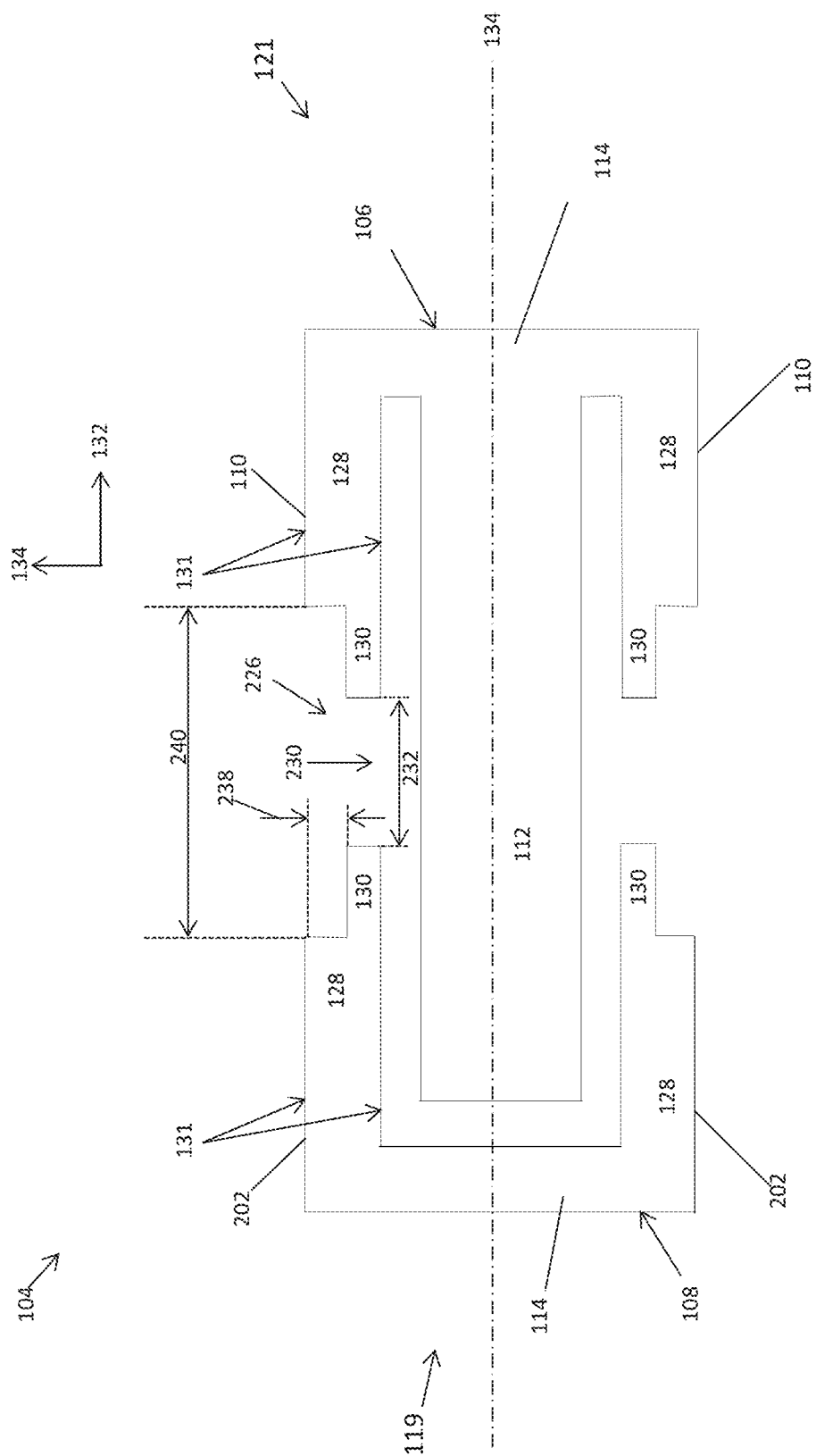
FIG. 2 illustrates a top view of one embodiment of an electrode layer of the present invention.

It is to be understood by one of ordinary skill in the art that the present discussion is a description of exemplary embodiments only, and is not intended as limiting the broader aspects of the present invention.

Generally speaking, the present invention is directed to a multilayer ceramic capacitor. In particular, the present invention is directed to a multilayer ceramic capacitor containing an active electrode region containing alternating dielectric layers and electrode layers and a shield electrode region containing at least one shield electrode. The multilayer ceramic capacitor also includes a top surface and a bottom surface opposing the top surface. The present inventors have discovered that by controlling the distance between the active electrode region and the shield region and/or the distance between active electrode region and the top surface of the capacitor provides various advantages.

In general, the distance between the active electrode region and the shield region is about 1.0 mil or more, such as about 1.3 mils or more, such as about 1.5 mils or more, such as about 1.7 mils or more, such as about 1.9 mils or more to about 2.5 mils or less, such as about 2.3 mils or less, such as about 2.1 mils or less. For instance, the distance between the active electrode region and the shield region is from about 1.0 mil to about 2.5 mils, such as from about 1.3 mils to about 2.3 mils, such as from about 1.5 mils to about 2.1 mils, such as from about 1.7 mils to about 2.3 mils, such as from about 1.9 mils to about 2.1 mils. Such distance may be about 4% or more, such as about 5% or more, such as about 6% or more, such as about 7% or more to about 20% or less, such as about 18% or less, such as about 15% or less, such as about 13% or less, such as about 11% or less the thickness of the capacitor.

In general, the distance between the active electrode region and the top surface of the capacitor is about 1.5 mils or more, such as about 1.8 mils or more, such as about 2.0 mils or more, such as about 2.1 mils or more, such as about 2.3 mils or more, such as about 2.5 mils or more to about 3.2 mils or less, such as about 3.0 mils or less, such as about 2.9 mils or less, such as about 2.8 mils or less. For instance, the distance between the active electrode region and the top surface of the capacitor is from about 1.8 mils to about 3.2 mils, such as from about 2.0 mils to about 3.0 mils, such as from about 2.3 mils to about 3.0 mils, such as from about 2.5 mils to about 2.9 mils. Such distance may be about 5% or more, such as about 8% or more, such as about 9% or more, such as about 10% or more to about 25% or less, such as about 20% or less, such as about 18% or less, such as about 15% or less, such as about 14% or less the thickness of the capacitor.

The present inventors have discovered that such distances can provide a multilayer ceramic capacitor with a low insertion loss. In general, the insertion loss is the loss of power through the capacitor and may be measured using any method generally known in the art. In addition to a low insertion loss, such insertion loss may generally increase as the frequency becomes higher. For instance, such increase may occur at least during a portion of a frequency range of from 4 GHz to 40 GHz, such as at least 25% of the range, such as at least 50% of the range, such as at least 75% of the range, such as at least 80% of the range.

For instance, the insertion loss may be about 0.3 dB or less, such as about 0.28 dB or less, such as about 0.25 dB or less, such as about 0.23 dB or less when measured across a frequency range of from 4 GHz to 10 GHz. The insertion loss may be about 0.05 dB or more, such as about 0.08 dB or more, such as about 0.10 dB or more when measured across a frequency range of from 4 GHz to 10 GHz.

The insertion loss may be about 0.4 dB or less, such as about 0.38 dB or less, such as about 0.35 dB or less, such as about 0.34 dB or less when measured across a frequency range of from 13 GHz to 20 GHz. The insertion loss may be about 0.15 dB or more, such as about 0.18 dB or more, such as about 0.20 dB or more when measured across a frequency range of from 13 GHz to 20 GHz.

The insertion loss may be about 0.45 dB or less, such as about 0.4 dB or less, such as about 0.38 dB or less, such as about 0.35 dB or less, such as about 0.32 dB or less when measured across a frequency range of from 23 GHz to 30 GHz. The insertion loss may be about 0.15 dB or more, such as about 0.18 dB or more, such as about 0.20 dB or more, such as about 0.22 dB or more when measured across a frequency range of from 23 GHz to 30 GHz.

The insertion loss may be about 0.55 dB or less, such as about 0.5 dB or less, such as about 0.48 dB or less, such as about 0.45 dB or less, such as about 0.43 dB or less when measured across a frequency range of from 33 GHz to 40 GHz. The insertion loss may be about 0.20 dB or more, such as about 0.25 dB or more, such as about 0.28 dB or more when measured across a frequency range of from 33 GHz to 40 GHz.

In addition, the capacitor may have an overall capacitance of about 20 nF or more, such as about 50 nF or more, such as about 70 nF or more, such as about 90 nF or more, such as about 100 nF or more, such as about 115 nF or more, such as about 130 nF or more. The overall capacitance may be about 250 nF or less, such as about 200 nF or less, such as about 175 nF or less, such as about 160 nF or less, such as about 150 nF or less, such as about 130 nF or less, such as about 120 nF or less.

In addition, such advantages may be realized when employing a capacitor with a relatively small thickness. For instance, the capacitor may have a thickness of about 13 mils or more, such as about 15 mils or more, such as about 18 mils or more to about 50 mils or less, such as about 40 mils or less, such as about 30 mils or less, such as about 25 mils or less, such as about 23 mils or less, such as about 22 mils or less.

As a result, the present inventors have discovered that the capacitors as disclosed herein may be employed over a broad frequency range thereby allowing for use in various ultra-broadband applications.

As indicated above, the present invention includes a multilayer ceramic capacitor that contains a plurality of capacitive elements within a single, unitary package. The capacitor includes a top surface and a bottom surface opposite the top surface. The capacitor also includes at least one side surface that extends between the top surface and the bottom surface. The capacitor may include at least four side surfaces that extend between the top surface and the bottom surface. In one embodiment, the capacitor includes at least six total surfaces (e.g., one top, one bottom, four sides). For instance, the capacitor and/or the main body of the capacitor may have a parallelepiped shape, such as a rectangular parallelepiped shape.

In general, the capacitor includes alternating dielectric layers and electrode layers, which may form at least a part of the main body of the capacitor. By arranging the dielectric layers and the electrode layers in a stacked or laminated configuration, the capacitor may be referred to as a multilayer capacitor and in particular a multilayer ceramic capacitor, for instance when the dielectric layers comprise a ceramic. In general, the stack of alternating dielectric layers and electrode layers (i.e., active electrode layers) may be referred to herein as an active electrode region.

The electrode layers include a plurality of first electrode layers and a plurality of second electrode layers. In particular, the first electrode layers and the second electrode layers are interleaved in an opposed and spaced apart relation with a dielectric layer located between each adjacent electrode layer. In this regard, the first electrode layer and the second electrode layer may be presented in a parallel relationship.

In general, the thickness of the dielectric layers and the electrode layers is not limited and can be any thickness as desired depending on the performance characteristics of the capacitor. For instance, the thickness of the electrode layers can be, but is not limited to, being about 500 nm or greater, such as about 1 μm or greater, such as about 2 μm or greater, such as about 3 μm or greater, such as about 4 μm or greater to about 10 μm or less, such as about 5 μm or less, such as about 4 μm or less, such as about 3 μm or less, such as about 2 μm or less. For instance, the electrode layers may have a thickness of from about 1 μm to about 2 μm. In addition, in one embodiment, the thickness of the dielectric layer may be defined according to the aforementioned thickness of the electrode layers. Also, it should be understood that such thicknesses of the dielectric layers may also apply to the layers between any anchor electrode layers, shield electrode layers, and/or floating electrode layers, when present and as defined herein.

Each electrode layer includes a first electrode and a second (counter) electrode. For instance, the first electrode and the second electrode may be in substantially the same plane, longitudinally and laterally. The first electrode includes a central portion or main body that extends away from an external terminal and one end of the first electrode toward the other external terminal. Such portion may extend directly from the external terminal. Alternatively, such portion may extend from a base portion of the first electrode, which along with the central portion or main body also extends from the external terminal. In general, the base portion of the first electrode extends along a longitudinal edge of the first electrode adjacent the external terminal. In addition, the central portions of the first electrodes of adjacent electrode layers at last partially overlap in a vertical direction.

Each first electrode includes at least one electrode arm that extends away from the external terminal. The electrode arm may extend directly from the external terminal. Alternatively, the electrode arm may extend from a base portion of the first electrode, which along with the arm also extends from the external terminal. In some embodiments, at least two electrode arms extend away from the external terminal. The electrode arms may extend directly from the external terminal. Alternatively, the electrode arms may extend from a base portion of the first electrode, which along with the arms also extends from the external terminal.

The second electrode may also include at least one electrode arm. The electrode arm may extend directly from the external terminal. When two electrode arms are present, both electrode arms may extend directly from the external terminal. Alternatively, the electrode arm may extend from a base portion of the second electrode, which along with the arm also extends from the external terminal. In some embodiments, at least two electrode arms extend from the base portion; in such embodiments, the electrode arms are adjacent each side of the central portion of the first electrode. In general, the electrode arm(s) of the second electrode are longitudinally aligned with the electrode arm(s) of the first electrode.

It should be understood that when the arms extend from the base portion, such extension is also from the external terminal; however, such extension may not necessarily be directly from the external terminal.

In general, at least one electrode arm may include a main portion and a step portion. For instance, at least one electrode arm of each electrode may include a main portion and a step portion. In some embodiments, each electrode may include two electrode arms and both electrode arms of the electrodes may include a main portion and a step portion. The step portion is offset from at least one lateral edge of the main portion. In one embodiment, the offset is from the lateral edge of the main portion closer the central portion of the first electrode. In another embodiment, the offset is from the lateral edge of the main portion further away from the central portion of the first electrode. In one embodiment, the step portion is offset from both lateral edges of the main portion. However, in another embodiment, it should be understood that the electrode arm may not include a step portion.

The main portion of the electrode arm has a width in the lateral direction and the step portion of the electrode arm has a width in the lateral direction. The width of the step portion is 5% or more, such as 15% or more, such as 25% or more, such as 35% or more, such as 40% or more the width of the main portion. The width of the step portion is less than 100%, such as 90% or less, such as 80% or less, such as 70% or less, such as 60% or less, such as 50% or less the width of the main portion.

In addition, the electrode arm has a length in the longitudinal direction wherein the length is the distance of the arm from the longitudinal edge adjacent and connecting to the external terminal to the opposing longitudinal edge that defines the longitudinal edge of the step portion. Accordingly, the main portion of the electrode arm and the step portion of the electrode arm have a length in the longitudinal direction wherein such lengths are a portion of the length of the electrode arm. The step portion of the electrode arm may have a length (i.e., distance from the longitudinal edge adjacent and connecting to the external terminal to the opposing longitudinal edge that defines the step portion) that is 5% or more, such as 15% or more, such as 20% or more, such as 25% or more, such as 35% or more, such as 40% or more the length of the electrode arm. The step portion of the electrode arm may have a length that is 80% or less, such as 70% or less, such as 60% or less, such as 50% or less, such as 40% or less, such as 30% or less the length of the electrode arm. The main portion of the electrode arm may have a length (i.e., distance from the longitudinal edge adjacent and connecting to the external terminal to the opposing longitudinal edge that defines the main portion) that is 5% or more, such as 15% or more, such as 25% or more, such as 35% or more, such as 45% or more, such as 55% or more such as 65% or more, such as 75% or more the length of the electrode arm. The main portion of the electrode arm may have a length that is less than 100%, such as 90% or less, such as 80% or less, such as 70% or less, such as 60% or less, such as 50% or less, such as 40% or less the length of the electrode arm.

In addition, a gap (i.e., main gap distance) is present between the main portion of the electrode arm of a first electrode and the second electrode (e.g., second electrode arm, in particular main portion of the second electrode arm). The length of such gap may be 5% or more, such as 15% or more, such as 20% or more, such as 25% or more, such as 35% or more the length of the capacitor from one external terminal to the other in the longitudinal direction. The length of such gap may be 60% or less, such as 50% or less, such as 45% or less, such as 40% or less, such as 35% or less the length of the capacitor from one external terminal to the other in the longitudinal direction. The length of such gap may be 50% or more, such as 60% or more, such as 70% or more, such as 80% or more, such as 90% or more, such as 95% or more, such as 98% or more, such as 100% the length of the main portion of the electrode arm.

In addition, a gap (i.e., step gap distance) is present between the step portion of the electrode arm of a first electrode and the second electrode (e.g., second electrode arm, in particular step portion of the second electrode arm). The length of such gap may be 1% or more, such as 3% or more, such as 5% or more, such as 7% or more, such as 8% or more the length of the capacitor from one external terminal to the other in the longitudinal direction. The length of such gap may be 30% or less, such as 20% or less, such as 15% or less, such as 10% or less the length of the capacitor from one external terminal to the other in the longitudinal direction. The length of such gap may be 5% or more, such as 10% or more, such as 15% or more, such as 18% or more the length of the step portion of the electrode arm. The length of such gap may be 50% or less, such as 40% or less, such as 30% or less, such as 25% or less, such as 20% or less the length of the step portion of the electrode arm.

Also, the gap present between the step portion of the electrode arm of a first electrode and the second electrode may be 5% or more, such as 10% or more, such as 15% or more, such as 20% or more, such as 25% or more the gap present between the main portion of the electrode arm of a first electrode and the second electrode. The gap present between the step portion of the electrode arm of a first electrode and the second electrode may be 70% or less, such 50% or less, such as 40% or less, such as 35% or less, such as 30% or less, such as 25% or less the gap present between the main portion of the electrode arm of a first electrode and the second electrode.

Additionally, a gap or space exists between the lateral edge of a central portion of a first electrode and the lateral edge of the electrode arm adjacent (nearest) the aforementioned lateral edge of the central portion. Such lateral edge of the electrode arm adjacent the central portion may be of the first electrode or the second electrode. Such gap or space may be 40% or more, such as 50% or more, such as 60% or more, such as 70% or more, such as 80% or more, such as 90% or more, such as 100% the width of the step portion of the electrode arm of the first electrode.

Also, in an embodiment wherein the second electrode does not include a base portion, a gap may be present between the longitudinal edge of the central portion opposing the longitudinal edge adjacent to and connected to the external terminal and the other external terminal. Such gap may be 1% or more, such as 3% or more, such as 5% or more, such as 7% or more, such as 8% or more the length of the capacitor from one external terminal to the other in the longitudinal direction. The length of such gap may be 30% or less, such as 20% or less, such as 15% or less, such as 10% or less the length of the capacitor from one external terminal to the other in the longitudinal direction.

Such an electrode configuration may allow for a multilayer ceramic capacitor to contain a plurality of capacitive elements or regions. For instance, turning to FIGS. 1A-1C, the first electrode layer 104 includes a first electrode 106 and a second electrode 108. The first electrode 106 and the second electrode 108 include an electrode arm 110 including a main portion 128 and a step portion 130 that is offset from a lateral edge 131 of the main portion 128. In general, at least one capacitive element or region may be formed between the central portion 112 of the first electrode 106 of the first electrode layer 102 and the central portion 112 of the first electrode 106 of the second active electrode layer 104 (i.e., primary capacitive element). However, with the specific electrode configuration as disclosed herein, a secondary capacitive element or region (i.e., a central capacitive region 122) may be formed between the central portion 112 of the first electrode 106 and the base portion 114 and/or the electrode arms 110 of the second electrode 108. Additionally, another secondary capacitive element (i.e., a main arm gap capacitive region 124) may be formed within the gap between the main portions 128 of the electrode arms 110 of the first electrode 106 and the second electrode 108. Further, another secondary capacitive element (i.e., a step arm gap capacitive region 126) may be formed between the step portions 130 of the electrode arms 110 of the first electrode 106 and the second electrode 108. However, as indicated above, it should be understood that the electrodes may not include a step portion in at least one embodiment.

Figure 7A:
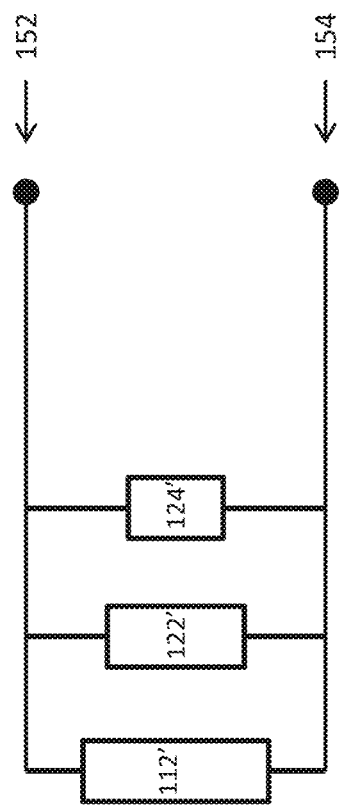
FIGS. 7A-7B depict a circuit schematic representation with capacitive areas.
Figure 7B:
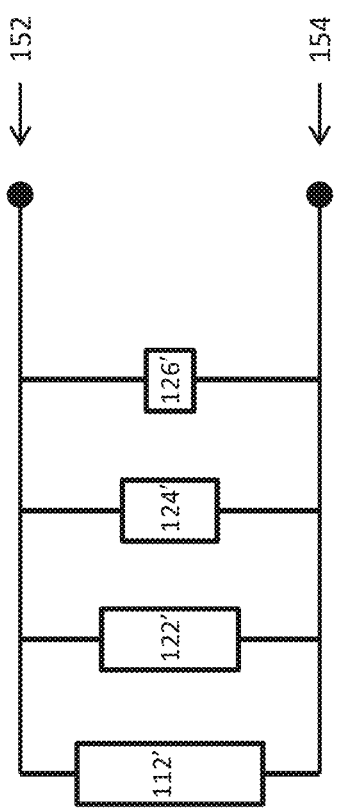

Accordingly, the electrode configuration may allow for a primary capacitive element between central portions of adjacent electrode layers (i.e., parallel plate capacitance) as well as additional secondary capacitive elements. Such capacitance is further depicted in FIGS. 7A and 7B. For instance, FIG. 7A depicts three groups of capacitance areas: primary capacitive element between adjacent electrode layers, a central capacitive region 122, and a main arm gap capacitive region 124. When the electrode arms include a step portion, the electrodes may include a step arm gap capacitive region 126. In this regard, FIG. 7B depicts four groups of capacitance areas: primary capacitive element between adjacent electrode layers, a central capacitive region 122, a main arm gap capacitive region 124, and a step arm gap capacitive region 126. The capacitive area for the primary capacitive element is depicted as 112' while the capacitive areas for secondary capacitive elements 122, 124, and 126 are depicted as 122', 124', and 126', respectively. In addition, the external terminals are depicted as 152 and 154.

It should be appreciated that the actual values of capacitors 112', 122', 124', and 126' may be selectively designed by adjusting the configuration of the capacitor and various parameters such as the number of electrode layers, the surface area of the overlapping central portions of electrode pairs, the distance separating electrodes, the dielectric constant of the dielectric material, etc. Nevertheless, the capacitor as disclosed herein may include an array of combined series and parallel capacitors to provide effective broadband performance.

In one exemplary ultra-broadband capacitor embodiment, primary capacitor 112' generally corresponds to a relatively large capacitance adapted for operation at a generally lower frequency range, such as on the order of between about several kilohertz (kHz) to about 200 megahertz (MHz), while secondary capacitors 122', 124', and 126' generally correspond to relatively smaller value capacitors configured to operate at a relatively higher frequency range, such as on the order of between about 200 megahertz (MHz) to many gigahertz (GHz).

In this regard, additional means for coupling of opposing polarity electrodes within the capacitor body may be introduced and such approach may be more efficient and effective by creating such plurality of capacitive elements within a single set of stacked electrodes. For instance, the primary capacitive element may be effective at relatively low frequencies while the secondary capacitive elements may be effective at relatively medium and/or high frequencies. For instance, the primary capacitance may be within 1 and 500 nF, such as within about 10 and 100 nF while the secondary capacitance may be within 1 and 500 pF, such as within 10 and 100 pF.

In addition to the above, it should be understood that the capacitor of the present invention may include additional electrode layers. For instance, as generally known in the art, the capacitor of the present invention may include anchor electrode layers, shield electrode layers, floating electrode layers, or a combination thereof. In one embodiment, the capacitor includes anchor (or dummy) electrode layers. In another embodiment, the capacitor includes at least shield electrode layers. In another embodiment, the capacitor includes at least floating electrodes. In another embodiment, capacitor includes both anchor electrode layers and shield electrode layers. In another embodiment, the capacitor includes anchor electrode layers, shield electrode layers, and floating electrode layers. When present, such electrode layers are also provided in an interleaved configuration with dielectric layers. However, it should be understood that the capacitor may not include any of the aforementioned anchor electrode layers or shield electrode layers.

As indicated above, the capacitor may include anchor electrode layers. In such embodiment, an anchor electrode layer may include a third anchor electrode and a fourth anchor electrode. Such anchor electrodes may be in substantially the same plane, longitudinally and laterally. The anchor electrode layers may be employed to provide additional nucleation points and guides for external termination, for instance when plating a thin-film layer of conductive material directly to the electrode layers exposed along a surface of the main body of the capacitor. Such plating techniques, as further described herein, may be referred to as electroless and/or electrolytic plating.

In general, the positioning of such anchor electrode layers is not necessarily limited. In one embodiment, such anchor electrode layers may be provided between respective the first electrode layers and the second electrode layers. In another embodiment, such anchor electrode layers may be provided above and/or below a stack of alternating dielectric layers and internal (active or first/second) electrode layers. Such anchor electrode layers may be provided within an anchor electrode region wherein each region includes at least one anchor electrode layer. For instance, the anchor electrode layers may be provided on top of and adjacent the stacked assembly of dielectric layers and active electrode layers. The anchor electrode layers may be provided beneath and adjacent the stacked assembly of dielectric layers and electrode layers. When present, the third anchor electrode of the anchor electrode layer may contact the first external terminal while the fourth anchor electrode of the anchor electrode layer may contact the second external terminal.

In addition, the anchor electrode layers may have any configuration known in the art. For instance, the third anchor electrode and the fourth anchor electrode may have a C-shaped configuration. For instance, the anchor electrodes may have a base portion and at least one, such as two, electrode arms extending from the base portion, in particular from the lateral ends of the base portion. Such electrode arms may extend in the longitudinal direction away from an end of the capacitor body. The electrode arms of the third and fourth anchor electrodes may also be longitudinally aligned. The electrode arms may have dimensions and gaps as illustrated in the figures; such dimensions and gaps may be the same as the gaps and arms as described for the first and second electrodes of the electrode layers. In general, the anchor electrodes may have configurations that are different than the configurations of the first and second active electrode layers described above and the shield electrodes described below.

In one embodiment, the electrode arms of the anchor electrodes may also have a main portion and a step portion. Such main portion and step portion are defined the same as with respect to the electrode arms of the first and second electrodes of the electrode layers. In this regard, the dimensions of the arms, the main portions, and/or the step portions of the anchor electrodes and the first electrodes and/or the second electrodes may be substantially similar. Nevertheless, it should be understood that the anchor electrodes may also include electrode arms that do not have a step portion.

As indicated above, the capacitor may include a shield electrode layer. In such embodiment, a shield electrode layer may include a fifth shield electrode and a sixth shield electrode. Such shield electrodes may be in substantially the same plane, longitudinally and laterally. The shield electrode layer may be employed to provide additional capacitance, protection from electromagnetic interference, and/or other shielding characteristics.

In general, the positioning of such shield electrode layer is not necessarily limited. For instance, in one embodiment, the shield electrode layer may be provided above and/or below a stack of alternating dielectric layers and internal (active or first/second) electrode layers. Such shield electrode layers may be provided within a shield electrode region wherein each region includes at least one shield electrode layer. For instance, the shield electrode layers may be provided above a stacked assembly of dielectric layers and electrode layers. Alternatively, the shield electrode layers may be provided below a stacked assembly of dielectric layers and electrode layers. In another embodiment, the shield electrode layers may be provided above and below a stacked assembly of dielectric layers and electrode layers. When present, the fifth shield electrode of the shield electrode layer may contact the first external terminal while the sixth shield electrode of the shield electrode layer may contact the second external terminal.

The shield electrode region may be immediately above the active electrode region. In one embodiment, the shield electrode region may be separated from the active electrode region by a dielectric region, for instance one that does not contain any electrode layers. In one embodiment, the shield electrode region may be separated from the active electrode region by an anchor electrode region. In another embodiment, the shield electrode region may be separated from the active electrode region by a dielectric region and an anchor electrode region.

In general, the shield electrode layers may have any configuration known in the art. For instance, the fifth shield electrode and the sixth shield electrode may have a rectangular configuration (i.e., do not include a step portion). Alternatively, the fifth shield electrode and the sixth shield electrode may have a step as disclosed herein. For instance, the step may be in a lateral direction from a lateral edge of the shield electrode. In this regard, the dimensions of the step portion of the shield electrodes and the first electrodes and/or second electrodes may be substantially similar. In general, the shield electrodes may have configurations that are different than the configurations of the first and second active electrode layers described above and the anchor electrodes described above.

In addition, the shield electrode layer may include a shield layer gap between the fifth electrode and the sixth electrode. For instance, the fifth electrode may be connected to a first terminal while the sixth electrode may be connected to a second terminal. The shield layer gap may be the distance between the unconnected ends of the respective terminals in a longitudinal direction. In one embodiment, such shield layer gap may be less than an external terminal gap between the external terminals on a top surface and/or bottom surface of the capacitor. For instance, the external terminals may terminate on a top surface and or a bottom surface of the capacitor. The distance between the termination ends of the external terminals on such surface may be defined as an external terminal gap in a longitudinal direction. For instance, such length of shield layer gap in a longitudinal direction may be about 3% or more, such as about 5% or more, such as about 10% or more, such as about 15% or more, such as about 20% or more, such as about 25% or more, such as about 30% or more to less than 100%, such as about 80% or less, such as about 60% or less, such as about 40% or less, such as about 35% or less, such as about 25% or less, such as about 20% or less, such as about 15% or less, such as about 10% or less the length of the external terminal gap in a longitudinal direction. However, it should be understood that in another embodiment, the length of the shield layer gap may be substantially the same as the length of the external terminal gap.

In one embodiment, the shield electrode layer may be separated from the stacked assembly by an anchor electrode region containing at least one anchor electrode layer. In this regard, the shield electrode layer may be provided above and/or below at least one anchor electrode region. For instance, the shield electrode layer may be provided on top of and adjacent at least one anchor electrode region. The shield electrode layer may be provided immediately beneath and adjacent at least one anchor electrode region. In one embodiment, such anchor electrode regions may include a plurality of anchor electrode layers.

Additionally, the shield electrode may be buried within the capacitor. For instance, the main body of the capacitor may include a ceramic cover on a top surface and/or a bottom surface. In one embodiment, the capacitor includes a ceramic cover on both a top surface and a bottom surface. The ceramic cover may be the same material as employed for the dielectric layers. In one embodiment, however, the capacitor may include a shield electrode layer adjacent the top surface and/or the bottom surface of the capacitor. Such shield electrode may assist in forming the external terminals.

As indicated above, the capacitor may include a floating electrode layer containing at least one floating electrode. In such embodiment, a floating electrode layer may include a seventh electrode. In general, such floating electrodes are not directly connected to an external terminal. However, the floating electrode may a part of a floating electrode layer containing at least one electrode that is electrically connected to an external terminal; however, such floating electrode layer contains at least one floating electrode that does not directly contact such electrode or external terminal.

The floating electrode may be positioned and configured according to any method known in the art. For instance, the floating electrode may be provided such that it overlaps at least a portion, such as a central portion, of a first electrode of a first electrode layer and/or a second electrode layer. In this regard, the floating electrode layer is layered and disposed alternately with the first electrode layers and the second internal electrode layers; in this regard, such layers may be separated by the dielectric layers.

In addition, such floating electrodes may have any shape as generally known in the art. For instance, in one embodiment, the floating electrode layers may include at least one floating electrode having a dagger like configuration. For instance, such configuration may be similar to the configuration and shape of the first electrode as described herein. However, it should be understood that such first electrode may or may not contain an electrode arm with a step portion.

In addition, in one embodiment, the floating electrode layer may contain at least one floating electrode wherein the end of the floating electrode is adjacent at least one external terminal but does not contact such external terminal. In this regard, such gap may be referred to as a floating electrode gap in a longitudinal direction. Such floating electrode gap may be greater than 0%, such as about 3% or more, such as about 5% or more to about 50% or less, such as about 40% or less, such as about 30% or less, such as about 20% or less, such as about 10% or less the length of the capacitor in the longitudinal direction.

Additionally, the capacitor includes a first external terminal and a second external terminal. In particular, the first extremal terminal may be disposed along a first end or side surface of the capacitor while the second external terminal may be disposed along a second end or side surface of the capacitor that is opposite the first end or side surface in the longitudinal direction. In general, the first electrodes of the first electrode layers and the second (counter) electrodes of the second electrode layers are electrically connected to a first external terminal. Meanwhile, the first electrodes of the second electrode layers and the second (counter) electrodes of the first electrode layers are electrically connected to a second external terminal. In one embodiment, the external terminals wrap around to the top surface and/or the bottom surface. In another embodiment, each external terminal wraps around and contacts five surfaces—the top surface, the bottom surface, and three side surfaces. In another embodiment, the external terminals are only present on a side surface such that they do not wrap around to the top surface, the bottom surface, and/or any other side surfaces.

Additionally, it should be understood that the capacitor as disclosed herein may be mounted in any orientation as desired. For instance, the capacitor may be mounted horizontally such that the dielectric layers and/or the electrode layers are substantially parallel with the surface upon which the capacitor is mounted. In this regard, the dielectric layers and/or the electrode layers are stacked in a vertical direction. Alternatively, the capacitor may be mounted vertically in which the dielectric layers and/or the electrode layers are substantially orthogonal to the surface upon which the capacitor is mounted. In addition, when mounted vertically, the capacitor may be mounted in at least two different orientations. For instance, the capacitor may be mounted such that the long edges of the dielectric layers and/or the electrode layers are adjacent the surface. Alternatively, the capacitor may be mounted such that the short edges of the dielectric layers and/or the electrode layers are adjacent the surface.

The present invention is also directed to a method of making an ultra-broadband capacitor. The method includes providing an active electrode region containing alternating dielectric layers and active electrode layers and providing a shield electrode region containing at least one shield electrode. The method may also require the distances between the active electrode region and the shield electrode region and/or between the active electrode region and the top surface of the capacitor as defined herein. In addition, when present, the method may also include providing at least one anchor electrode layer.

In addition, the method may include exposing a longitudinal edge of each base portion in the main body; such exposure may assist in forming the external terminals. Such exposure may already be present when forming the electrode layers. In addition, the electrode may be exposed on at least three surfaces; such exposure may allow for a wrap-around termination. For instance, such wrap-around termination may be present on at least three surfaces, such as at least five surfaces of the capacitor. Thus, the method may also include forming a first external terminal and a second external terminal as disclosed herein.

The capacitor of the present invention can be further described according to the embodiments as illustrated in FIGS. 1A-1D, 2, 3A-3B, 4A-4B, 5A-5C, 6A-6D, and 8A-8C. As illustrated in the figures, 134 refers to a lateral direction while 132 refers to a longitudinal direction wherein the lateral direction 134 may be perpendicular to the longitudinal direction 132. Meanwhile, 136 refers to a vertical direction (i.e., a z-direction).

Turning to FIGS. 1A-1D, one embodiment of a multilayer ceramic capacitor is disclosed. FIG. 1D illustrates a multilayer capacitor 100 containing a plurality of first electrode layers 106 and second electrode layers 108. The multilayer capacitor 100 contains a first external terminal 118 connected to the first electrode 106 of first electrode layer 102 and the second (counter) electrode of second electrode layer 104. The multilayer capacitor contains a second external terminal 120 connected to the first electrode 106 of second electrode layer 104 and the second (counter) electrode of first electrode layer 102.

FIG. 1A illustrates a top view of the first electrode layers 102 and second electrode layers 104. Each electrode layer includes a first electrode 106 and a second electrode 108. The first electrode 106 may have a base portion 114 that extends along a longitudinal edge of the first electrode 106. The first electrode 106 has a pair of electrode arms 110 and at least one central portion 112 extending from the base portion 114. The second electrode 108 may have a base portion 114 that extends along a longitudinal edge of the second electrode layer 108. The second electrode has a pair of electrode arms 110 extending from the base portion 114. In addition, FIG. 1A illustrates an electrode arm 110 containing a main portion 128 and a step portion 130. The step portion is created from a step or offset 116. That is, the step portion 116 is offset from at least one lateral edge 131 of the main portion 128 of the electrode arm 110.

Meanwhile, as illustrated in FIG. 1A, second electrode layer 104 has the same configuration as first electrode layer 102 except that it is a mirrored configuration.

In addition to the embodiment of FIG. 1A, it should be understood that various other electrode configurations may be employed. For instance, such electrode configurations are illustrated in FIGS. 8A-8C. As shown in FIG. 8A, first electrode 106 includes a central portion 112 and a pair of electrode arms 110 extending from the base portion 114. Meanwhile, second electrode 108 includes a pair of electrode arms 110 extending from the longitudinal end adjacent external terminal 119. In FIG. 8B, the first electrode 106 includes a central portion 112 and a pair of electrode arms 110 extending from the longitudinal end adjacent external terminal 121; meanwhile, second electrode 108 includes a pair of electrode arms 110 extending from the base portion 114. In FIG. 8C, the first electrode 106 includes a central portion 112 and a pair of electrode arms 110 extending from the longitudinal end adjacent external terminal 121; meanwhile, second electrode 108 includes a pair of electrode arms 110 extending from the longitudinal end adjacent external terminal 119.

Thus, as illustrated in FIGS. 8A and 8C, without a base portion in the second electrode 108, a central capacitance region 122 is formed between the central portion 112 of the first electrode 106 and the arms 110 of the second electrode 108 and an external capacitance region 125 is formed between the leading longitudinal edge (opposing the edge adjacent external terminal 121) of the central portion 112 of the first electrode 106 and the external terminal 119. In this regard, the depiction in FIG. 7 may include an additional parallel connection for capacitive region 125'.

Referring to FIG. 1B, a plurality of first electrode layers 102 and a plurality of second electrode layers 104 are present in an alternating, mirrored configuration. As illustrated in the figure, the central portions 112 of the respective electrode layers at least partially overlap. FIG. 1B illustrates a total of six electrode layers; however, it should be understood that any number of electrode layers may be employed to obtain the desired capacitance for the desired application.

Referring to FIGS. 1C and 1D, the first electrode 106 of the second electrode layer 104 may be electrically connected with a second terminal 120 along a second end 121; similarly (and not pictured), the first electrode 106 of the first electrode layer 102 may be electrically connected with a first external terminal 118 along a first end 119. In some embodiments, several capacitive regions may be formed between the first electrode 106 and the second electrode 108. For example, in some embodiments, a central capacitive region 122 may be formed between the central portion 112 of the first electrode 106 and the base portion 114 and/or arms 110 of the second electrode 108. In some embodiments, a main arm gap capacitive region 124 may be formed within the gap between the main portions 128 of the electrode arms 110 of the first electrode 106 and the second electrode 108. Further, a step arm gap capacitive region 126 may be formed between the step portions 130 of the electrode arms 110 of the first electrode 106 and the second electrode 108.

Referring to FIG. 2, in some embodiments, a second electrode layer 104 may include the first electrode 106 and the second electrode 108 described above. The first electrode 106 may have an electrode arm 110, and the electrode arm 110 may include a main portion 128 and a step portion 130. The main portion 128 may have at least one lateral edge 131 extending from the second end 120 of the multilayer capacitor in a longitudinal direction 132. The step portion 130 may be offset in a lateral direction 134 from a lateral edge 131 of the main portion 128.

The second electrode 108 may be electrically connected with the first external terminal 119 and may have an electrode arm 202 extending in the longitudinal direction 132. In some embodiments, the electrode arm 110 may be generally longitudinally aligned with the electrode arm 202. In some embodiments, the electrode arm 110 and the electrode arm 202 may be spaced apart in the longitudinal direction 132 to form a main gap 226 between the main portions 128 of the electrode arm 100 and the electrode arm 202. The main gap 226 may have a main gap distance 240 in the longitudinal direction 132.

In some embodiments, the step portion 130 of the electrode arm 110 may extend beyond the main portion 128 of the electrode arm 110 in the longitudinal direction 132 and away from the second end 120. Similarly, the step portion 130 of the electrode arm 202 may extend beyond the main portion 128 of the electrode arm 202 in the longitudinal direction 132 and away from the second end 119. In this regard, in some embodiments, the electrode arm 110 and electrode arm 202 may form a step gap 230 between the step portion 130 of the electrode arm 110 and the electrode arm 202. The step gap 230 may have a step gap distance 232 in the longitudinal direction 132.

In some embodiments, the step portion 130 of the electrode arm 110 may be inwardly offset from the lateral edge 131 of the main portion 128 towards a lateral centerline 234 of the at least one of the plurality of electrode layers. An offset distance 238 may defined in the lateral direction 134 between the lateral edge 131 and a lateral edge of a step portion 130 proximate the lateral edge 131 of the main portion 128. However, as further described herein, it should be understood that the electrode arms may have alternative configurations with regards to the step portions.

Figure 3B:
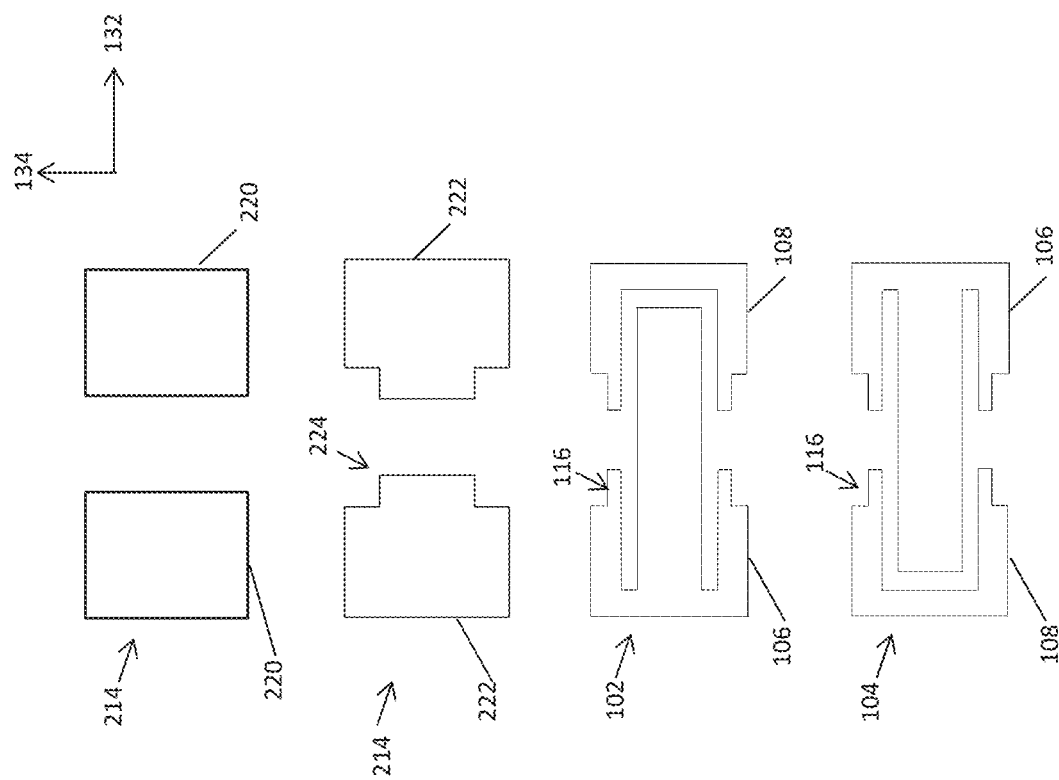
FIG. 3B illustrates top views of the electrodes of the capacitor of FIG. 3A in accordance with one embodiment of the present invention.
Figure 3A:
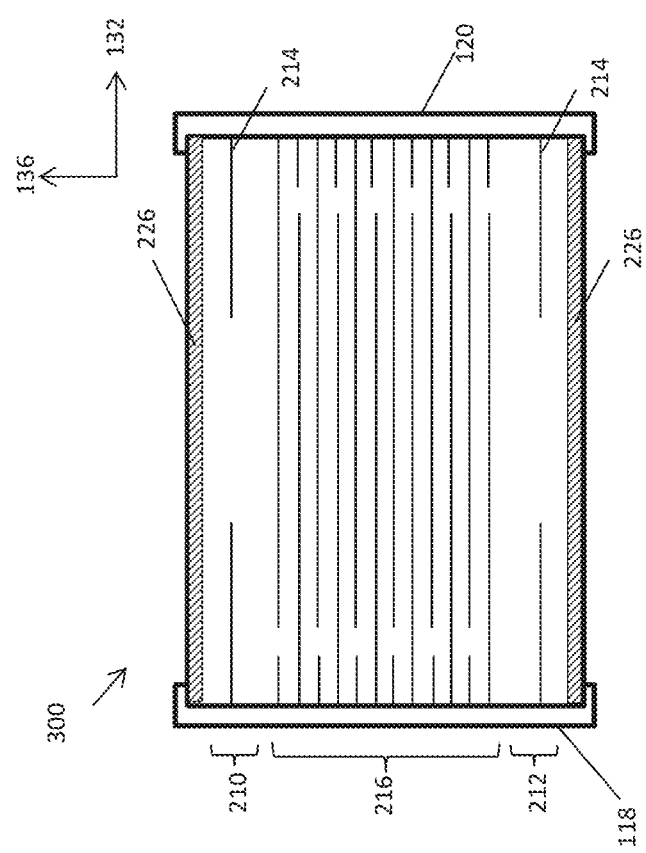
FIG. 3A illustrates a side cross sectional view of one embodiment of a capacitor of the present invention.

Referring to FIGS. 3A and 3B, in some embodiments, a multilayer capacitor 300 may include a first external terminal 118 disposed along a first end 119 and a second external terminal 120 disposed along a second end 121 that is opposite the first end 119 in the longitudinal direction 132. The multilayer capacitor 300 may include a plurality of dielectric layers and a plurality of electrode layers wherein the electrode layers are interleaved in an opposed and spaced apart relation with a dielectric layer located between each adjacent electrode layer.

In addition, as indicated above, the multilayer capacitor may include a shield electrode. For example, as illustrated in FIG. 3A, the multilayer capacitor 300 may include a first shield region 210 and a second shield region 212, and each of the shield regions 210, 212 may include one or more shield electrode layers 214. The shield regions 210, 212 may be spaced apart from the active electrode region 216 by a dielectric region (for instance one not containing any electrode layers). Referring to FIG. 3B, the shield electrode layers 214 may have a first shield electrode configuration, in which each shield electrode 220 is generally rectangular. In other embodiments, the shield electrode layers 214 may have a second shield electrode configuration, in which the shield electrodes 222 include a step 224, for example as explained above with reference to the electrodes of FIGS. 1A and 2, at an edge of the shield electrode opposite the edge of the shield electrode adjacent the external terminal.

In some embodiments, an active electrode 218 region may be disposed between the first and second shield regions 210, 212. The active electrode region 216 may include a plurality of alternating active electrode layers 218, for example, as explained with reference to FIGS. 1A-1D. Additionally, a pair of ceramic covers 226 may be disposed along the top and/or bottom surfaces of the capacitor 300.

Figure 4B:
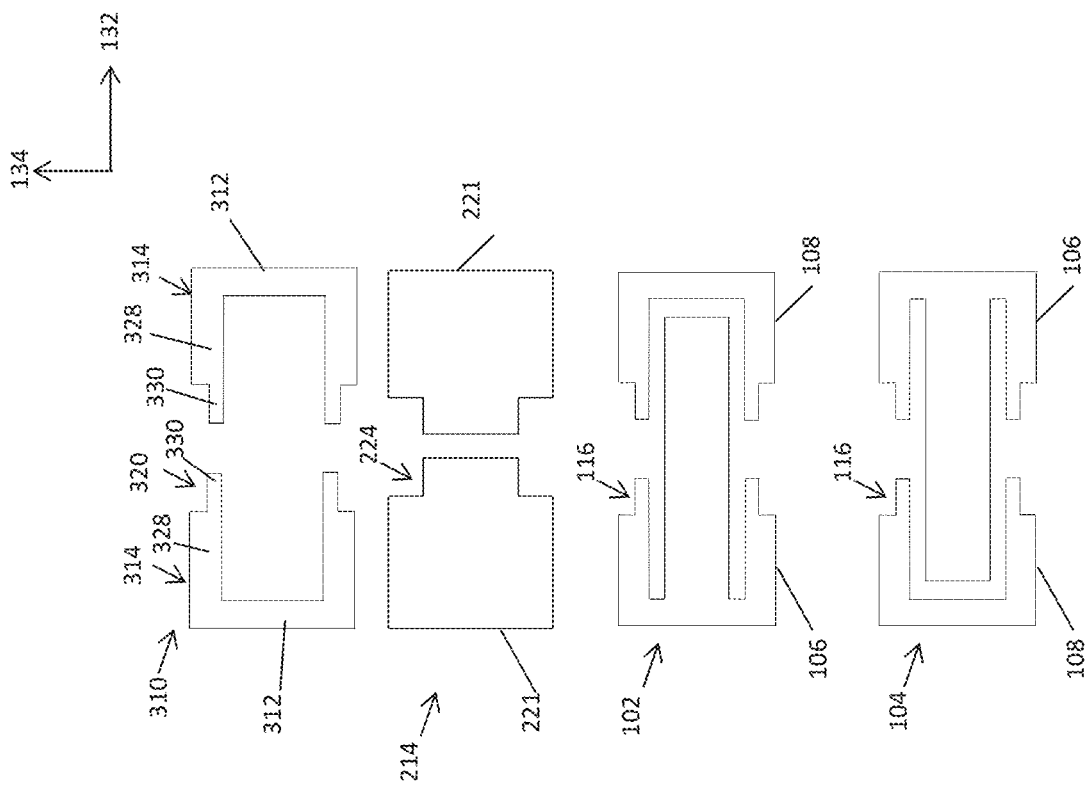
FIG. 4B illustrates top views of the electrodes of the capacitor of FIG. 4A in accordance with one embodiment of the present invention.
Figure 4A:
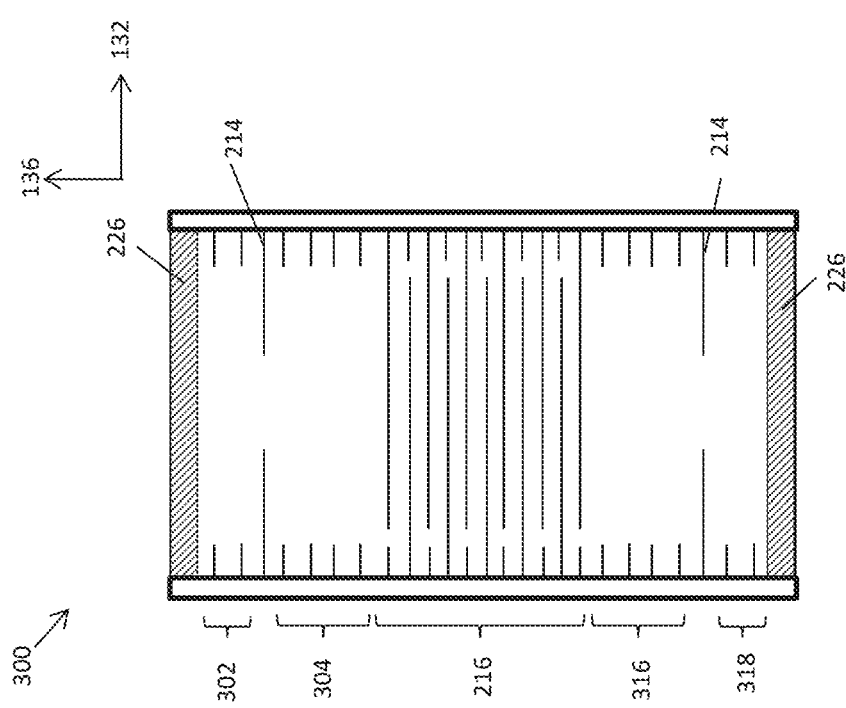
FIG. 4A illustrates a side cross sectional view of one embodiment of a capacitor of the present invention.

Referring to FIGS. 4A and 4B, in some embodiments, the multilayer capacitor 300 may also include anchor electrode regions 302, 304, 316, and/or 318. For example, the multilayer capacitor 300 may include a first anchor electrode region 304 on top of the active electrode region 216. Further, a shield electrode region 210 containing a shield electrode layer 214 may be positioned above, such as on top, of the first anchor electrode region 304. Additionally, a second anchor electrode region 302 may be positioned above, such as on top, of top of the shield electrode region 210. Similarly, the multilayer capacitor 300 may include a third anchor electrode region 316 below, such as immediately below, the active electrode region 216. Further, a shield electrode region 210 containing a shield electrode layer 214 may be positioned below, such as immediately below, the third anchor electrode region 316. Additionally, a fourth anchor electrode region 318 may be positioned below, such as immediately below, the shield electrode region 210. In this regard, the active electrode region 216 may be disposed between the first anchor electrode region 304 and the third anchor electrode region 316, for example. The active electrode region 216 may be configured as described above with reference to FIGS. 3A and 3B.

Referring to FIG. 4B, the anchor electrode regions 302, 304, 316, and/or 318 may include a plurality of anchor electrode layers 310, each having a pair of anchor electrodes 312. The anchor electrodes 312 may include a pair of electrode arms 314. Each electrode arm 314 of the anchor electrodes 312 may include a main portion 328 and a step portion 330, for example, in a similar manner as described above with reference to the electrodes of FIGS. 1A and 2.

Figure 5A:
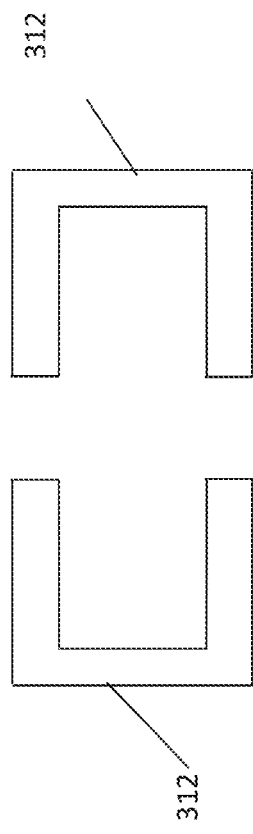
FIGS. 5A-5C illustrate top views of anchor electrodes in accordance with certain embodiments of the present invention.
Figure 5B:
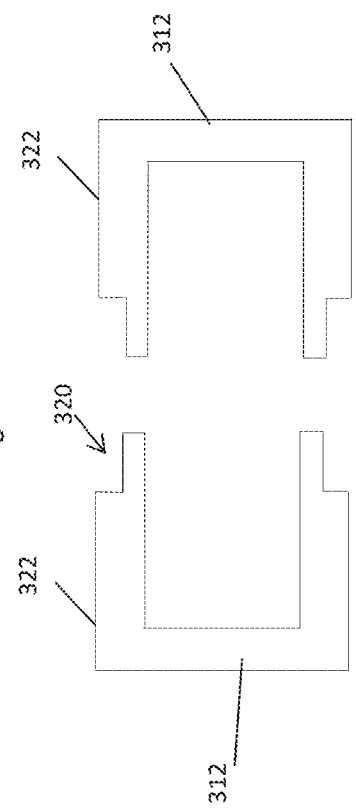
Figure 5C:
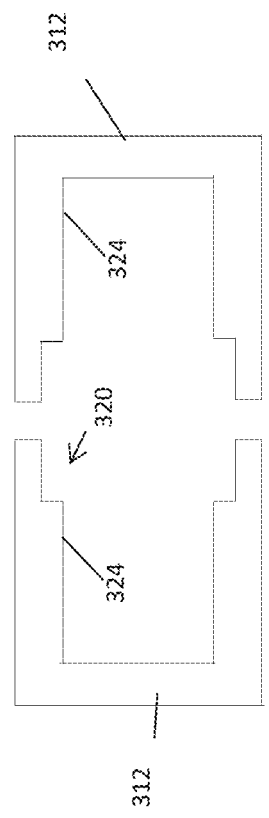

Referring to FIGS. 5A, 5B, and 5C, the anchor electrodes 312 may have various configurations. For example, referring to FIG. 5A, in some embodiments, the electrode arms 314 of the anchor electrodes 312 may not include a step. For instance, such electrodes may be presented in a C-shaped configuration without a step. Referring to FIG. 5B, in some embodiments, the electrode arms 314 of the anchor electrodes 312 may include a step portion 320 that is inwardly offset from an outer lateral edge 322 of the anchor electrode 312. Referring to FIG. 5C, in other embodiments, the step portion 320 may be offset from an inner lateral edge 324 of the arms 314 of the anchor electrodes 312. Yet other configurations are possible. For example, in some embodiments, the step portion 320 may be offset from both the outer lateral edge 322 and the inner lateral edge 324.

Referring to FIGS. 6A-6C, in some embodiments, the active electrodes 106, 108 may have various other configurations. For example, referring to FIG. 6A, in some embodiments, each of the first electrodes 106 and second electrodes 108 may include a single arm 110, instead of a pair of arms 110, 202 as described above with respect to FIG. 2. In this regard, such electrodes may include one electrode containing a central portion that extends from a base and one electrode arm that also extends from the base portion; meanwhile, the counter electrode may include a base portion and only one electrode arm extending from the base portion of such second electrode.

Referring to FIG. 6B, in some embodiments, each of the first electrodes 106 and second electrodes 108 may include central portions 112. For instance, each electrode 106, 108 may include a central portion 112 that extends from a respective base portion in addition to at least one electrode arm 110, 202, such as two electrode arms 110, 202, that extend from the respective base portion.

Referring to FIG. 6C, in some embodiments, the electrode arms 110, 202 of the electrodes 106, 108 may have a step portion 130 that is outwardly offset from an inner lateral edge 324 of the main portion of an electrode arm away from a lateral centerline 236 of the at least one of the electrodes 106, 108 of the electrode layers. Lastly, referring to FIG. 6D, in some embodiments, the electrode arms 110 of the electrodes 106, 108 may have step portions 130 that are offset from both the outer lateral edge 322 and the inner lateral edge 324 of the electrode arms 110, 202.

In addition to the embodiments illustrated and described herein, the central portion of the electrodes may have any configuration known in the art. For instance, as illustrated in FIGS. 1A and 6A-6D, the central portions may have a relatively rectangular configuration. That is, the lateral edges may extend substantially linearly in a longitudinal direction. However, other configurations may also be employed. For instance, in one embodiment, the central portion of the electrodes may include a paddle-like configuration; in such an embodiment, the lateral edges extend substantially linearly in a longitudinal direction away from a base portion, then in a lateral direction away from the central portion and then again substantially linearly in a longitudinal direction away from the base portion. In another embodiment, the central portion of the electrodes may include a wing-like configuration; in such an embodiment, the lateral edges extend substantially linearly in a longitudinal direction away from a base portion, then in a lateral direction away from a central portion, then again substantially linearly in a longitudinal direction away from the base portion, then again in a lateral direction toward the central portion, and then again substantially linearly in a longitudinal direction away from the base portion.

In general, the present invention provides a multilayer capacitor with an electrode having a unique configuration that provides various benefits and advantages. In this regard, it should be understood that the materials employed in constructing the capacitor may not be limited and may be any as generally employed in the art and formed using any method generally employed in the art.

In general, the dielectric layers are typically formed from a material having a relatively high dielectric constant (K), such as from about 10 to about 40,000 in some embodiments from about 50 to about 30,000, and in some embodiments, from about 100 to about 20,000.

In this regard, the dielectric material may be a ceramic. The ceramic may be provided in a variety of forms, such as a wafer (e.g., pre-fired) or a dielectric material that is co-fired within the device itself.

Particular examples of the type of high dielectric material include, for instance, NPO (COG) (up to about 100), X7R (from about 3,000 to about 7,000), X7S, ZSU, and/or Y5V materials. It should be appreciated that the aforementioned materials are described by their industry-accepted definitions, some of which are standard classifications established by the Electronic Industries Alliance (EIA), and as such should be recognized by one of ordinary skill in the art. For instance, such material may include a ceramic. Such materials may include a pervoskite, such as barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other suitable perovskites may include, for instance, $Ba_xCa_{1-x}TiO_3$ where x is from about 0.2 to about 0.8, and in some embodiments, from about 0.4 to about 0.6, $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). In one particular embodiment, the dielectric layers may comprise a titanate.

The electrode layers may be formed from any of a variety of different metals as is known in the art. The electrode layers may be made from a metal, such as a conductive metal. The materials may include precious metals (e.g., silver, gold, palladium, platinum, etc.), base metals (e.g., copper, tin, nickel, chrome, titanium, tungsten, etc.), and so forth, as well as various combinations thereof. Sputtered titanium/tungsten (Ti/W) alloys, as well as respective sputtered layers of chrome, nickel and gold, may also be suitable. The electrodes may also be made of a low resistive material, such as silver, copper, gold, aluminum, palladium, etc. In one particular embodiment, the electrode layers may comprise nickel or an alloy thereof.

External terminals may be formed from any of a variety of different metals as is known in the art. The external terminals may be made from a metal, such as a conductive metal. The materials may include precious metals (e.g., silver, gold, palladium, platinum, etc.), base metals (e.g., copper, tin, nickel, chrome, titanium, tungsten, etc.), and so forth, as well as various combinations thereof. In one particular embodiment, the external terminals may comprise copper or an alloy thereof.

The external terminals can be formed using any method generally known in the art. The external terminals may be formed using techniques such as sputtering, painting, printing, electroless plating or fine copper termination (FCT), electroplating, plasma deposition, propellant spray/air brushing, and so forth.

In one embodiment, the external terminals may be formed such that the external terminals are relatively thick. For instance, such terminals may be formed by applying a thick film stripe of a metal to exposed portions of electrode layers. Such metal may be in a glass matrix and may include silver or copper. As an example, such strip may be printed and fired onto the capacitor. Thereafter, additional plating layers of metal (e.g., nickel, tin, solder, etc.) may be created over the termination strips such that the capacitor is solderable to a substrate. Such application of thick film stripes may be conducted using any method generally known in the art (e.g., by a termination machine and printing wheel for transferring a metal-loaded paste over the exposed electrode layers). Examples of components with external terminals formed by baked terminations and metal films plated thereon are disclosed in U.S. Pat. No. 5,021,921 to Sano et al., which is incorporated by reference herein for all purposes.

The thick-plated external terminals may have an average thickness of about 150 μm or less, such as about 125 μm or less, such as about 100 μm or less, such as about 80 μm or less. The thick-plated external terminals may have an average thickness of about 25 μm or more, such as about 35 μm or more, such as about 50 μm or more, such as about 75 or more μm. For instance, the thick-plated external terminals may have an average thickness of from about 25 μm to about 150 μm, such as from about 35 μm to about 125 μm, such as from about 50 μm to about 100 μm.

In another embodiment, the external terminals may be formed such that the external terminal is a thin-film plating of a metal. Such thin-film plating can be formed by depositing a conductive material, such as a conductive metal, on an exposed portion of an electrode layer. For instance, a leading edge of an electrode layer may be exposed such that it may allow for the formation of a plated termination.

The thin-plated external terminals may have an average thickness of about 50 μm or less, such as about 40 μm or less, such as about 30 μm or less, such as about 25 μm or less. The thin-plated external terminals may have an average thickness of about 5 μm or more, such as about 10 μm or more, such as about 15 μm or more. For instance, the external terminals may have an average thickness of from about 5 μm to about 50 μm, such as from about 10 μm to about 40 μm, such as from about 15 μm to about 30 μm, such as from about 15 μm to about 25 μm.

In general, the external terminal may comprise a plated terminal. For instance, the external terminal may comprise an electroplated terminal, an electroless plated terminal, or a combination thereof. For instance, an electroplated terminal may be formed via electrolytic plating. An electroless plated terminal may be formed via electroless plating.

When multiple layers constitute the external terminal, the external terminal may include an electroplated terminal and an electroless plated terminal. For instance, electroless plating may first be employed to deposit an initial layer of material. The plating technique may then be switched to an electrochemical plating system which may allow for a faster buildup of material.

When forming the plated terminals with either plating method, a leading edge of the lead tabs of the electrode layers that is exposed from the main body of the capacitor is subjected to a plating solution. By subjecting, in one embodiment, the capacitor may be dipped into the plating solution.

The plating solution contains a conductive material, such as a conductive metal, is employed to form the plated termination. Such conductive material may be any of the aforementioned materials or any as generally known in the art. For instance, the plating solution may be a nickel sulfamate bath solution or other nickel solution such that the plated layer and external terminal comprise nickel. Alternatively, the plating solution may be a copper acid bath or other suitable copper solution such that the plated layer and external terminal comprise copper.

Additionally, it should be understood that the plating solution may comprise other additives as generally known in the art. For instance, the additives may include other organic additives and media that can assist in the plating process. Additionally, additives may be employed in order to employ the plating solution at a desired pH. In one embodiment, resistance-reducing additives may be employed in the solutions to assist with complete plating coverage and bonding of the plating materials to the capacitor and exposed leading edges of the lead tabs.

The capacitor may be exposed, submersed, or dipped in the plating solution for a predetermined amount of time. Such exposure time is not necessarily limited but may be for a sufficient amount of time to allow for enough plating material to deposit in order to form the plated terminal. In this regard, the time should be sufficient for allowing the formation of a continuous connection among the desired exposed, adjacent leading edges of lead tabs of a given polarity of the respective electrode layers within a set of alternating dielectric layers and electrode layers.

In general, the difference between electrolytic plating and electroless plating is that electrolytic plating employs an electrical bias, such as by using an external power supply. The electrolytic plating solution may be subjected typically to a high current density range, for example, ten to fifteen amp/ft$^2$ (rated at 9.4 volts). A connection may be formed with a negative connection to the capacitor requiring formation of the plated terminals and a positive connection to a solid material (e.g., Cu in Cu plating solution) in the same plating solution. That is, the capacitor is biased to a polarity opposite that of the plating solution. Using such method, the conductive material of the plating solution is attracted to the metal of the exposed leading edge of the lead tabs of the electrode layers.

Prior to submersing or subjecting the capacitor to a plating solution, various pretreatment steps may be employed. Such steps may be conducted for a variety of purposes, including to catalyze, to accelerate, and/or to improve the adhesion of the plating materials to the leading edges of the lead tabs.

Additionally, prior to plating or any other pretreatment steps, an initial cleaning step may be employed. Such step may be employed to remove any oxide buildup that forms on the exposed lead tabs of the electrode layers. This cleaning step may be particularly helpful to assist in removing any buildup of nickel oxide when the internal electrodes or other conductive elements are formed of nickel. Component cleaning may be effected by full immersion in a preclean bath, such as one including an acid cleaner. In one embodiment, exposure may be for a predetermined time, such as on the order of about 10 minutes. Cleaning may also alternatively be effected by chemical polishing or harperizing steps.

In addition, a step to activate the exposed metallic leading edges of the lead tabs of the electrode layers may be performed to facilitate depositing of the conductive materials. Activation can be achieved by immersion in palladium salts, photo patterned palladium organometallic precursors (via mask or laser), screen printed or ink-jet deposited palladium compounds or electrophoretic palladium deposition. It should be appreciated that palladium-based activation is presently disclosed merely as an example of activation solutions that often work well with activation for exposed tab portions formed of nickel or an alloy thereof. However, it should be understood that other activation solutions may also be utilized.

Also, in lieu of or in addition to the aforementioned activation step, the activation dopant may be introduced into the conductive material when forming the electrode layers of the capacitor. For instance, when the electrode layer comprises nickel and the activation dopant comprises palladium, the palladium dopant may be introduced into the nickel ink or composition that forms the electrode layers. Doing so may eliminate the palladium activation step. It should be further appreciated that some of the above activation methods, such as organometallic precursors, also lend themselves to co-deposition of glass formers for increased adhesion to the generally ceramic body of the capacitor. When activation steps are taken as described above, traces of the activator material may often remain at the exposed conductive portions before and after termination plating.

Additionally, post-treatment steps after plating may also be employed. Such steps may be conducted for a variety of purposes, including enhancing and/or improving adhesion of the materials. For instance, a heating (or annealing) step may be employed after performing the plating step. Such heating may be conducted via baking, laser subjection, UV exposure, microwave exposure, arc welding, etc.

As indicated herein, the external terminal includes at least one plating layer. In one embodiment, the external terminal may comprise only one plating layer. However, it should be understood that the external terminals may comprise a plurality of plating layers. For instance, the external terminals may comprise a first plating layer and a second plating layer. In addition, the external terminals may also comprise a third plating layer. The materials of these plating layers may be any of the aforementioned and as generally known in the art.

For instance, one plating layer, such as a first plating layer, may comprise copper or an alloy thereof. Another plating layer, such as a second plating layer, may comprise nickel or an alloy thereof. Another plating layer, such as a third plating layer, may comprise tin, lead, gold, or a combination, such as an alloy. Alternatively, an initial plating layer may include nickel, following by plating layers of tin or gold. In another embodiment, an initial plating layer of copper may be formed and then a nickel layer.

In one embodiment, initial or first plating layer may be a conductive metal (e.g., copper). This area may then be covered with a second layer containing a resistor-polymeric material for sealing. The area may then be polished to selectively remove resistive polymeric material and then plated again with a third layer containing a conductive, metallic material (e.g., copper).

The aforementioned second layer above the initial plating layer may correspond to a solder barrier layer, for example a nickel-solder barrier layer. In some embodiments, the aforementioned layer may be formed by electroplating an additional layer of metal (e.g., nickel) on top of an initial electrolessly or electrolytically plated layer (e.g., plated copper). Other exemplary materials for layer the aforementioned solder barrier layer include nickel-phosphorus, gold, and silver. A third layer on the aforementioned solder-barrier layer may in some embodiments correspond to a conductive layer, such as plated Ni, Ni/Cr, Ag, Pd, Sn, Pb/Sn or other suitable plated solder.

In addition, a layer of metallic plating may be formed followed by an electroplating step to provide a resistive alloy or a higher resistance metal alloy coating, for example, electroless Ni—P alloy over such metallic plating. It should be understood, however, that it is possible to include any metal coating as those of ordinary skill in the art will understand from the complete disclosure herewith.

It should be appreciated that any of the aforementioned steps can occur as a bulk process, such as a barrel plating, fluidized bed plating and/or flow-through plating termination processes, all of which are generally known in the art. Such bulk processes enable multiple components to be processed at once, providing an efficient and expeditious termination process. This is a particular advantage relative to conventional termination methods, such as the printing of thick-film terminations that require individual component processing.

As described herein, the formation of the external terminals is generally guided by the position of the exposed leading edges of the lead tabs of the electrode layers. Such phenomena may be referred to as "self-determining" because the formation of the external plated terminals is determined by the configuration of the exposed conductive metal of the electrode layers at the selected peripheral locations on the capacitor.

Additional aspects of the above-described technology for forming thin-film plated terminations are described in U.S. Pat. Nos. 7,177,137 and 7,463,474 to Ritter et al., which are incorporated by reference herein for all purposes. It should be appreciated that additional technologies for forming capacitor terminals may also be within the scope of the present technology. Exemplary alternatives include, but are not limited to, formation of terminations by plating, magnetism, masking, electrophoretics/electrostatics, sputtering, vacuum deposition, printing or other techniques for forming both thick-film or thin-film conductive layers.

EXAMPLES

Example 1

A multilayer capacitor as defined herein was manufactured according to the specifications indicated below and those in the following table.

In particular, the capacitor was manufactured having a total chip thickness of 20 mils, a distance from the active electrode region to the shield region of 2 mils (10% of total thickness), and a distance from the active electrode region to the surface of 2.7 mils (13.5% of total thickness). For certain examples, the anchor electrodes did not include a step portion as defined herein.

| Example | Electrode-Central Portion | Step Portion in Anchor Electrode | Capacitance (nF) |
|---|---|---|---|
| 1 | Straight | N | 115 |
| 2 | Straight | Y | 110 |
| 3 | Straight | N | 110 |
| 4 | Straight | Y | 110 |
| 5 | Straight | N | 120 |
| 6 | Straight | Y | 110 |
| 7 | Paddle | N | 145 |
| 8 | Paddle | N | 135 |
| 9 | Paddle | N | 130 |
| 10 | Paddle | N | 125 |
| 11 | Paddle | N | 145 |
| 12 | Wing | Y | 140 |

The insertion loss of each capacitor was measured across a wide range of operational frequencies (i.e., from 4 GHz to 40 GHz). Such insertion loss was measured with the capacitors in horizontal and vertical configurations and two samples were tested for each data point. The ranges in the table below indicate a maximum insertion loss and a minimum insertion loss within a frequency range.

| | Insertion Loss (dB) | | | |
|---|---|---|---|---|
| Example | 4 GHz-10 GHz | 13 GHz-20 GHz | 23 GHz-30 GHz | 33 GHz-40 GHz |
| 1 | 0.15-0.25 | 0.33-0.45 | 0.35-0.40 | 0.40-0.60 |
| 2 | 0.12-0.22 | 0.28-0.40 | 0.28-0.42 | 0.400.55 |
| 3 | 0.15-0.25 | 0.30-0.45 | 0.30-0.42 | 0.42-0.55 |
| 4 | 0.12-0.22 | 0.25-0.35 | 0.22-0.40 | 0.30-0.45 |
| 5 | 0.10-0.22 | 0.20-0.32 | 0.20-0.38 | 0.30-0.52 |
| 6 | 0.15-0.25 | 0.28-0.40 | 0.28-0.38 | 0.32-0.52 |
| 7 | 0.07-0.12 | 0.15-0.55 | 0.40-0.70 | 0.50-0.78 |
| 8 | 0.05-0.15 | 0.15-0.45 | 0.30-0.62 | 0.45-0.68 |
| 9 | 0.07-0.15 | 0.12-0.48 | 0.30-0.62 | 0.40-0.68 |
| 10 | 0.05-0.12 | 0.12-0.52 | 0.28-0.60 | 0.40-0.70 |
| 11 | 0.08-0.12 | 0.12-0.50 | 0.42-0.75 | 0.45-0.80 |
| 12 | 0.12-0.20 | 0.15-0.50 | 0.30-0.62 | 0.40-0.68 |

Example 2

A multilayer capacitor as defined herein was manufactured according to the specifications indicated below and those in the following table.

| Example | Electrode-Central Portion | Active to Shield Distance (mils) | Active to Surface Distance (mils) | Chip Thickness (mils) | % Active to Shield of Overall Thickness | % Active to Surface of Overall Thickness | Step Portion in Anchor Electrode |
|---|---|---|---|---|---|---|---|
| 13 | Straight | 2 | 2.5 | 20 | 10 | 12.5 | N |
| 14 | Straight | 2 | 2.5 | 20 | 10 | 12.5 | Y |
| 15 | Straight | 2 | 2.7 | 20 | 10 | 13.5 | N |
| 16 | Straight | 2 | 2.7 | 20 | 10 | 13.5 | Y |
| 17 | Straight | 1.5 | 2 | 19 | 7.5 | 10 | N |
| 18 | Straight | 1.5 | 2 | 19 | 7.5 | 10 | Y |
| 19 | Straight | 1.5 | 2.2 | 19 | 7.5 | 11 | N |
| 20 | Straight | 1.5 | 2.2 | 19 | 7.5 | 11 | Y |
| 21 | Straight | 2 | 2.7 | 17 | 10 | 13.5 | N |
| 22 | Straight | 2 | 2.7 | 17 | 10 | 13.5 | Y |

-continued

| Example | Electrode-Central Portion | Active to Shield Distance (mils) | Active to Surface Distance (mils) | Chip Thickness (mils) | % Active to Shield of Overall Thickness | % Active to Surface of Overall Thickness | Step Portion in Anchor Electrode |
|---|---|---|---|---|---|---|---|
| 23 | Straight | 1.5 | 2.2 | 16 | 7.5 | 11 | N |
| 24 | Straight | 1.5 | 2.2 | 16 | 7.5 | 11 | Y |

The insertion loss of each capacitor was measured across a wide range of operational frequencies (i.e., from 4 GHz to 40 GHz). Such insertion loss was measured with the capacitors in a horizontal configuration such that the electrode layers were parallel to a mounting surface and stacked in a vertical direction.

| | Insertion Loss (dB) | | | |
|---|---|---|---|---|
| Example | 4 GHz-10 GHz | 13 GHz-20 GHz | 23 GHz-30 GHz | 33 GHz-40 GHz |
| 13 | 0.13-0.23 | 0.20-0.32 | 0.22-0.45 | 0.25-0.72 |
| 14 | 0.12-0.33 | 0.27-0.38 | 0.28-0.40 | 0.27-0.60 |
| 15 | 0.10-0.22 | 0.22-0.32 | 0.22-0.37 | 0.30-0.52 |
| 16 | 0.15-0.25 | 0.28-0.40 | 0.28-0.38 | 0.30-0.52 |
| 17 | 0.10-0.20 | 0.15-0.32 | 0.22-0.43 | 0.25-0.65 |
| 18 | 0.12-0.23 | 0.25-0.42 | 0.28-0.42 | 0.25-0.58 |
| 19 | 0.12-0.22 | 0.15-0.32 | 0.22-0.42 | 0.25-0.70 |
| 20 | 0.15-0.22 | 0.22-0.40 | 0.27-0.45 | 0.27-0.70 |
| 21 | 0.12-0.25 | 0.20-0.30 | 0.25-0.40 | 0.30-0.45 |
| 22 | 0.20-0.30 | 0.25-0.38 | 0.28-0.42 | 0.25-0.42 |
| 23 | 0.12-0.22 | 0.20-0.32 | 0.22-0.30 | 0.30-0.40 |
| 24 | 0.15-0.22 | 0.22-0.35 | 0.27-0.30 | 0.30-0.38 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A multilayer ceramic capacitor comprising:
   a first external terminal disposed along a first end of the capacitor;
   a second external terminal disposed along a second end of the capacitor that is opposite the first end in a longitudinal direction;
   an active electrode region containing alternating dielectric layers and active electrode layers; and
   a shield electrode region containing at least two shield electrodes that are spaced apart by a shield layer gap in the longitudinal direction;
   wherein a distance from the active electrode region to the shield electrode region is from about 4% to about 20% of a thickness of the capacitor between a top surface and a bottom surface opposing the top surface.

2. The multilayer ceramic capacitor of claim 1, wherein a distance from the active electrode region to the top surface ranges from about 4% to about 20% of the thickness of the capacitor.

3. The multilayer ceramic capacitor of claim 1, wherein a distance from the active electrode region to the top surface is from about 1.5 mils to 3.2 mils.

4. The multilayer ceramic capacitor of claim 1, wherein the distance from the active electrode region to the shield electrode region ranges from about 1.5 mils to 3.2 mils.

5. The multilayer ceramic capacitor of claim 1, wherein the capacitor exhibits an insertion loss of from 0.25 dB to 0.55 dB when measured across a frequency range of from 33 GHz to 40 GHz.

6. The multilayer ceramic capacitor of claim 1, wherein the capacitor exhibits an insertion loss of from 0.20 dB to 0.35 dB when measured across a frequency range of from 23 GHz to 30 GHz.

7. The multilayer ceramic capacitor of claim 1, wherein the capacitor exhibits an insertion loss of from 0.15 dB to 0.40 dB when measured across a frequency range of from 13 GHz to 20 GHz.

8. The multilayer ceramic capacitor of claim 1, wherein the capacitor exhibits an insertion loss of from 0.1 dB to 0.25 dB when measured across a frequency range of from 4 GHz to 10 GHz.

9. The multilayer ceramic capacitor of claim 1, wherein the active electrode layers comprise
   a first electrode electrically connected with the first external terminal, the first electrode having a first electrode arm comprising a main portion and a step portion, the main portion having a lateral edge extending from the first end of the multilayer capacitor, the step portion having a lateral edge offset from the lateral edge of the main portion; and
   a second electrode electrically connected with the second external terminal.

10. The multilayer ceramic capacitor of claim 9, wherein the first electrode arm and the second electrode are spaced apart to form a main gap distance between the main portion of the first electrode arm and the second electrode and a step gap distance between the step portion of the first electrode arm and the second electrode.

11. The multilayer ceramic capacitor of claim 10, wherein the main gap distance is from 5% to 60% the length of the capacitor from the first external terminal to the second external terminal.

12. The multilayer ceramic capacitor of claim 10, wherein the main gap distance is 50% or more the length of the main portion of the first electrode arm.

13. The multilayer ceramic capacitor of claim 10, wherein the step gap distance is from 1% to 30% the length of the capacitor from the first external terminal to the second external terminal.

14. The multilayer ceramic capacitor of claim 10, wherein the step gap distance is from 5% to 50% the length of the step portion of the first electrode arm.

15. The multilayer ceramic capacitor of claim 10, wherein the step gap distance is from 5% to 70% of the main gap distance.

16. The multilayer ceramic capacitor of claim 9, wherein the step portion of the first electrode arm is inwardly or outwardly offset from the lateral edge of the main portion towards a lateral centerline of the at least one of the electrode layers.

17. The multilayer ceramic capacitor of claim 9, wherein each lateral edge of the step portion is offset from each lateral edge of the main portion.

18. A multilayer ceramic capacitor comprising:
a first external terminal disposed along a first end of the capacitor;
a second external terminal disposed along a second end of the capacitor that is opposite the first end in a longitudinal direction;
an active electrode region containing alternating dielectric layers and active electrode layers; and
a shield electrode region containing at least two shield electrodes that are spaced apart by a shield layer gap in the longitudinal direction,
wherein the active electrode layers comprise:
a first electrode electrically connected with the first external terminal, the first electrode having a first electrode arm comprising a main portion and a step portion, the main portion having a lateral edge extending from the first end of the multilayer capacitor, the step portion having a lateral edge offset from the lateral edge of the main portion, and
a second electrode electrically connected with the second external terminal; and
wherein the step portion has a length that is 5% to 70% the length of the electrode arm.

19. A multilayer ceramic capacitor comprising:
a first external terminal disposed along a first end of the capacitor;
a second external terminal disposed along a second end of the capacitor that is opposite the first end in a longitudinal direction;
an active electrode region containing alternating dielectric layers and active electrode layers; and
a shield electrode region containing at least two shield electrodes that are spaced apart by a shield layer gap in the longitudinal direction,
wherein the active electrode layers comprise:
a first electrode electrically connected with the first external terminal, the first electrode having a first electrode arm comprising a main portion and a step portion, the main portion having a lateral edge extending from the first end of the multilayer capacitor, the step portion having a lateral edge offset from the lateral edge of the main portion, and
a second electrode electrically connected with the second external terminal; and
wherein the main portion has a length that is 25% to 90% the length of the electrode arm.

* * * * *